March 29, 1966 LEE LAVERE THOMPSON ETAL 3,243,043
METHOD OF CONTROLLING THE DISCHARGE OF SOLIDS FROM
AN ORIFICE OF A CENTRIFUGAL SEPARATOR
Filed Dec. 7, 1964 4 Sheets-Sheet 1
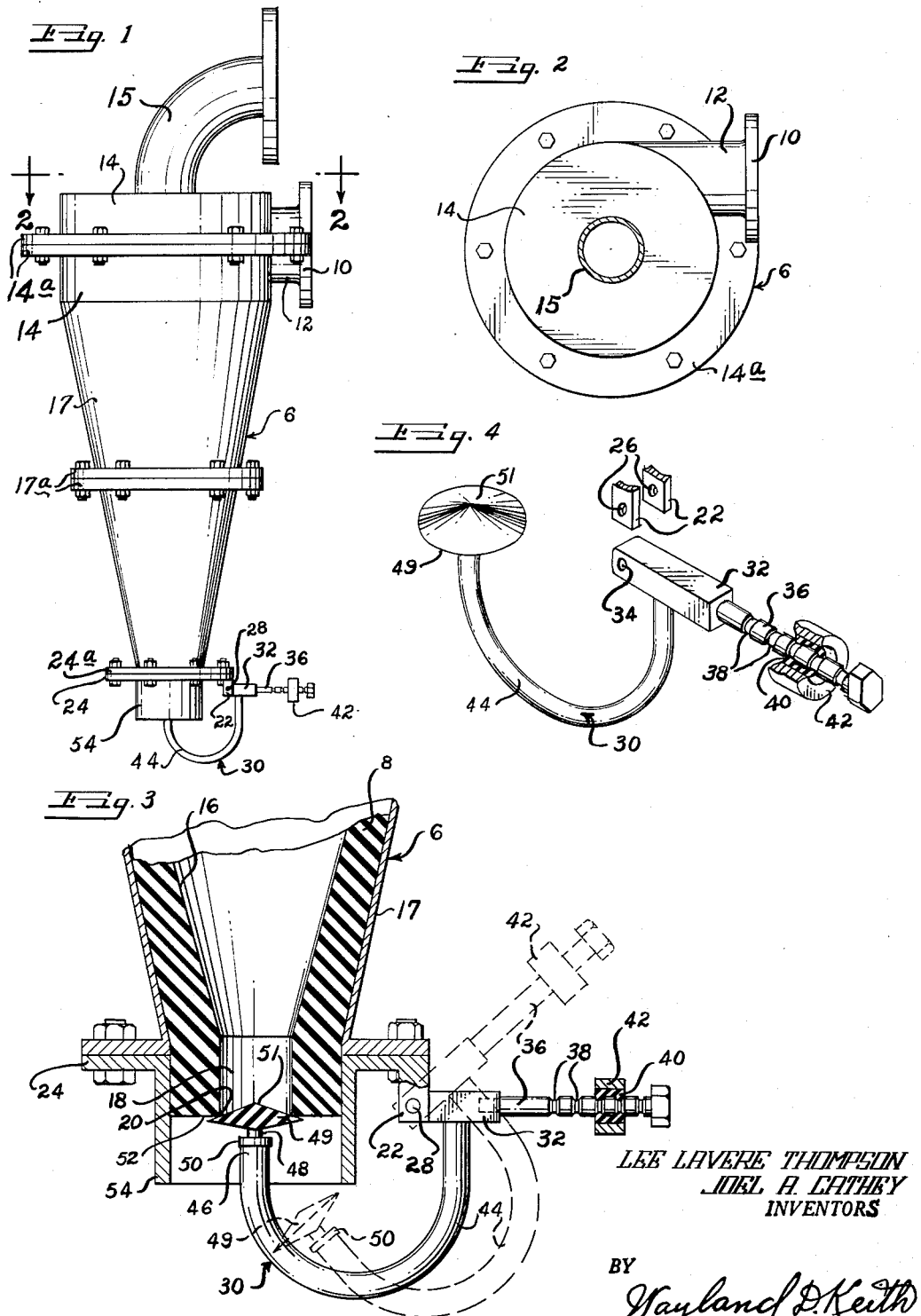
LEE LAVERE THOMPSON
JOEL A. CATHEY
INVENTORS
BY
Wayland D. Keith
THEIR AGENT

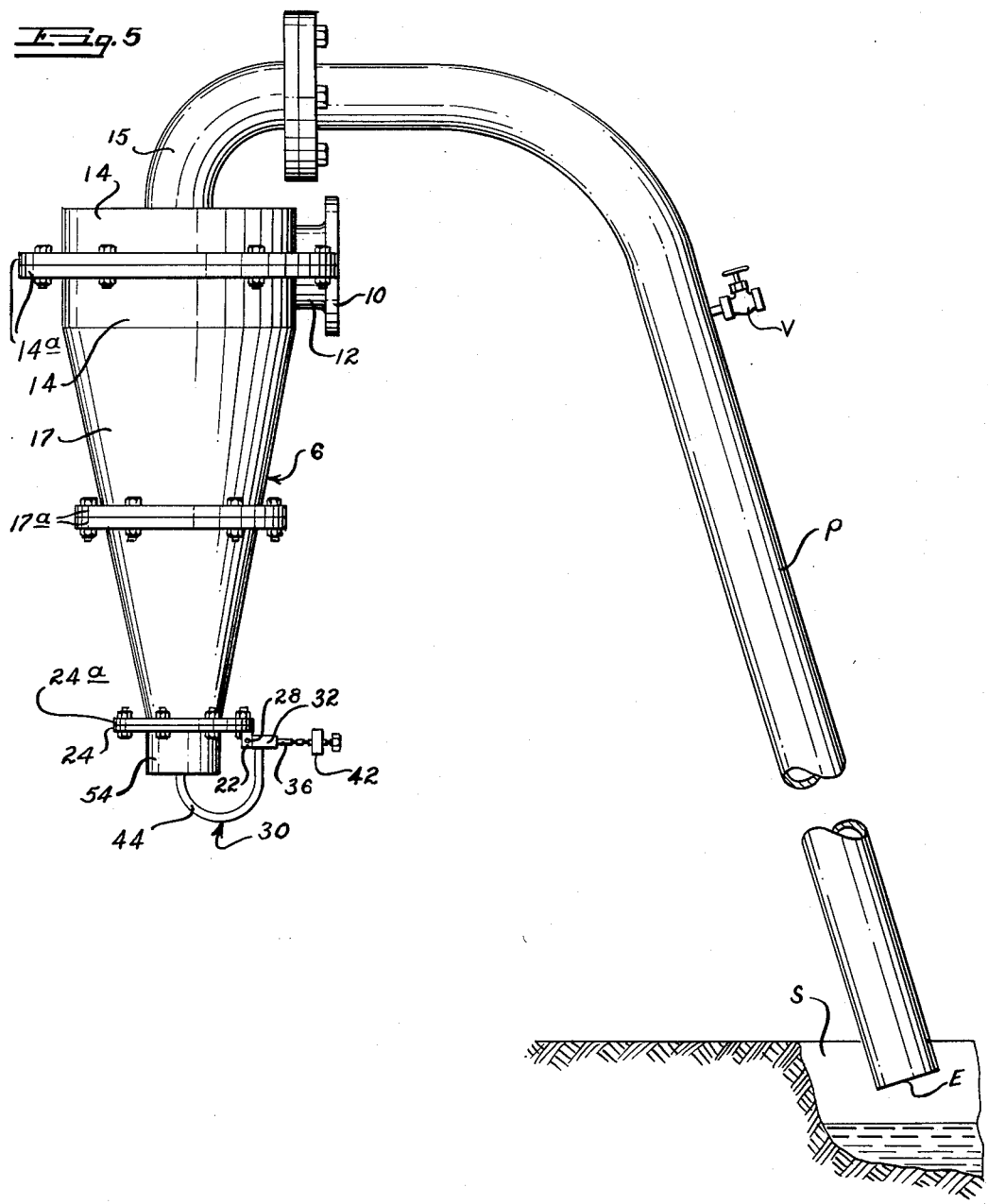

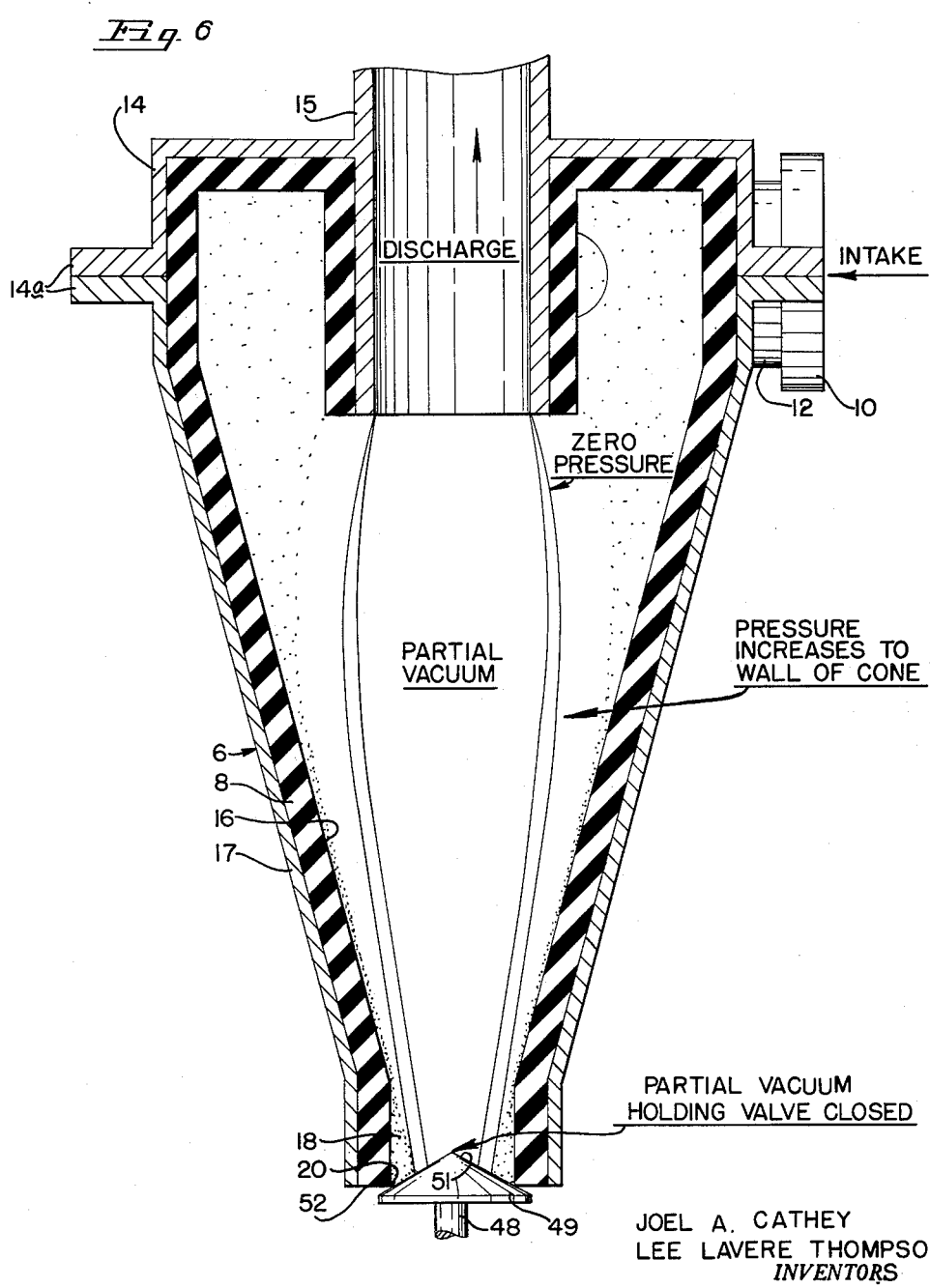

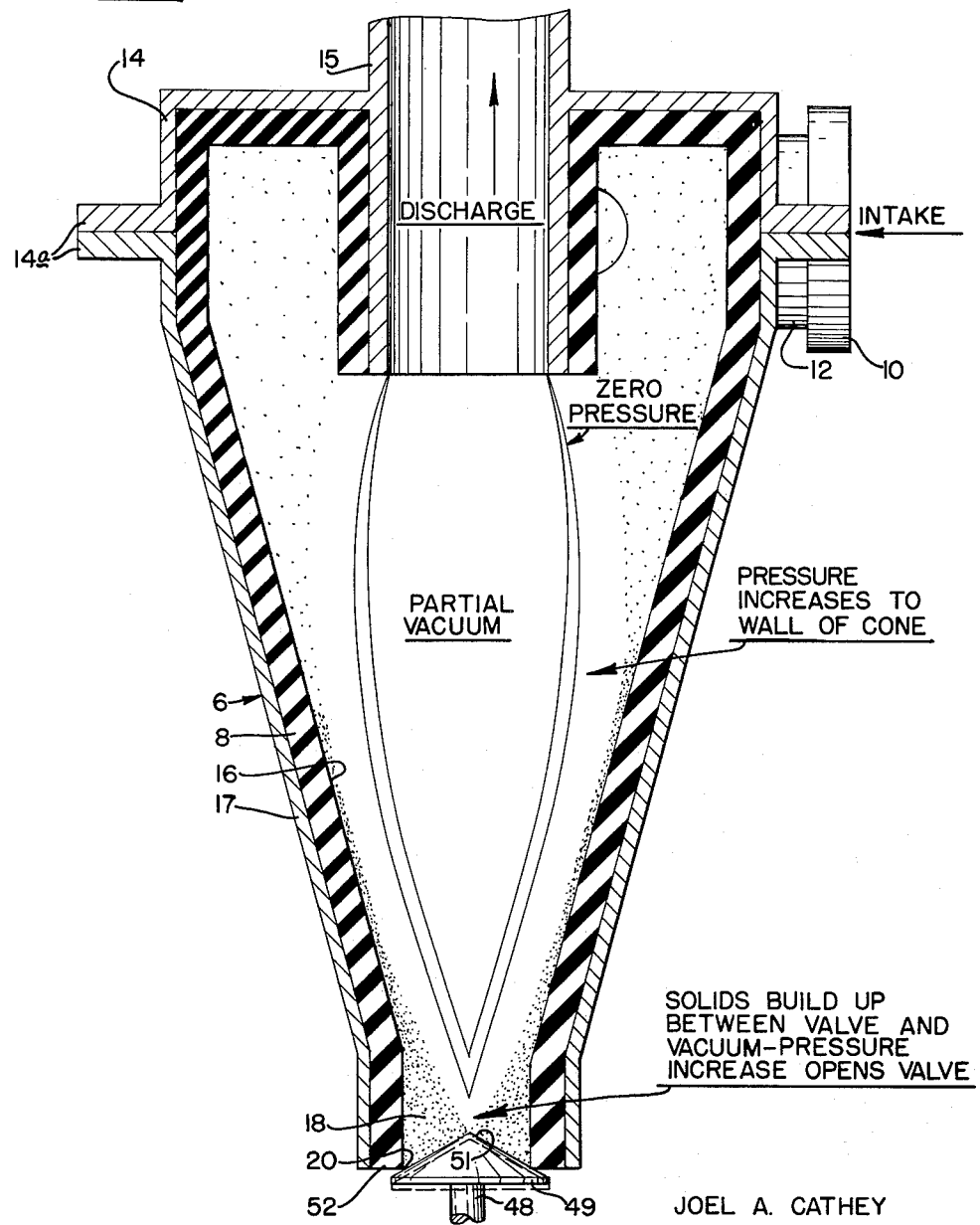

United States Patent Office 3,243,043
Patented Mar. 29, 1966

3,243,043
METHOD OF CONTROLLING THE DISCHARGE OF SOLIDS FROM AN ORIFICE OF A CENTRIFUGAL SEPARATOR
Lee Lavere Thompson, P.O. Box 547, and Joel A. Cathey, 310 E. Bank, both of Iowa Park, Tex.
Filed Dec. 7, 1964, Ser. No. 416,333
4 Claims. (Cl. 210—84)

This application is a continuation-in-part of our co-pending application Ser. No. 109,458, for Mechanism for Regulating Discharge From an Orifice, filed May 11, 1961, and now abandoned.

This invention relates to orifice regulators and more particularly to orifice regulators to regulate the outflow of solids from centrifuge machines which are used in separating solids from liquids, such as in desanding devices.

In the drilling of deep wells by the rotary drilling method, as well as in the mining industry, it is desirable to separate solids from liquids.

In the drilling of wells it is desirable to separate solids from liquids, which liquids usually are in the form of mud; mixed either with oil or water, which mud may vary in weight and viscosity, to meet the conditions under which the mud is being used, to bring the earth cuttings to the surface of the well being drilled. These solids include sand, shale, rock cuttings, and gravel, which must be separated from the mud so that the solids may be disposed of, and the mud, which has been cleansed of the solids may be re-used, over a long period of time. The solids separated from the mud, in this instance, are unwanted and are discarded. However, since some mud is compounded from gels and bentonite clays an some with weight increasing materials therein, such as barites and the like, and the mud may also contain "lost circulation" material, such as cotton seed hulls and other bulk or fibrous material, such mud is very expensive to compound, therefore earth strata solids must be removed therefrom with a minimum loss of mud. With the present orifice regulator used in conjunction with a centrifuge, such as is in general use for separating solids from drilling fluid, it is highly desirable to remove these solids from the drilling fluid with a minimum loss of mud, as mud prepared to the desired specifications is quite expensive.

The solids cut from the earth strata and brought to the top of the well in the rotary drilling mud are separated from the mud by the mud being swirled around the inner diameter of the conical centrifuge, which action causes the solids cut from the earth strata to be thrown outward and to move spirally downward on the inner conical surface of the centrifuge into a neck, whereby the solids from the earth strata are discharged from the lower end of the centrifuge through an orifice regulator, in proportion to the amount of solids cut, with a minimum loss of drilling mud.

In the use of the present device in the drilling of wells, such as oil wells and water wells by the rotary drilling method, the solids such as sand, shale and gravel are separated, at one step, to a point where the mud is substantially free of solids, thereby obviating the necessity, in many instances, of using shale separators, vibrating screens and the like, but enables the mud to be used over and over with a minimum loss of the specially prepared mud.

In the separation of solids, such as ore and free metals, such as copper, silver and gold from lighter weight, unwanted solids, such as sand, shale and rock from viscous mud by the use of a centrifuge, this enables these wanted solids to be whirled around the wall of the centrifuge at sufficient velocity to whirl the heavier metals and ores, which have preferably been crushed to a fairly uniform size, with the heavier solids moving downward around the conical inner surface, and with the lighter solids, such as sand, shale and rock, remaining in suspension in the viscous mud and being discharged outward through the central discharge in the top of the centrifuge. The heavier solids, such as the ores and free metals will move downward into a neck in the lower end of the centrifuge and settle on an inverted conical valve member, which will cause the solids to move downward along the sloping face of the conical valve member to a point where the face of the cone of the valve member seats on the neck at the lower end of the centrifuge. The conical valve member discharges the ore and/or free metals from the lower end of the centrifuge with a minimum loss of mud.

Upon recovering the wanted solids from the materials introduced into the mud, it is also desirable to recover the mud for re-use, therefore it is desirable to run the mud through a second stage of centrifugal separation, to separate the sand, shale and rock therefrom, to make possible the re-use of the mud.

The present device is used to effectively separate the solids from the liquids, and to separate solids from liquids which contain fibrous material, generally known as "lost circulation material," with no substantial loss of liquid or of the fibrous material which is entrained within the drilling mud, thereby preventing loss of "lost circulation material."

The present device is so constructed that it will either pass large or small volumes of either fine or coarse solids, and if solids are not being passed, the device will close the orifice by suction on the valve member of the centrifuge, and thereby maintain the liquid against loss.

Centrifuge machines in use heretofore for separating solids from drilling mud were, generally, constructed with an orifice of fixed size at the bottom of the centrifuge, so, as the solids were separated from the drilling mud, such as sand, shale and rock, these solids would flow outward through the opening. An orifice of this character would operate efficiently only when a given amount of solids were being separated from a mud of a given viscosity at a given pressure, and with related details calculated or tested for an orifice of that particular size. However, if the volume of solids increased, the orifice would frequently become clogged, and if the amount of solids decreased, the drilling mud would be lost by flowing out through the orifice. Such mud is quite costly and therefore should not be lost through an uncontrolled orifice.

The present device will so regulate the outflow of solids as to discharge certain solids from the centrifuge, but which will do so with a minimum loss of mud. However, if no solids are passing from the centrifuge, the device is so constructed as to completely close the orifice, in the lower end of the centrifuge, to retain the mud therein.

An object of this invention is to provide an orifice regulator for a centrifuge desanding device, which regulator will permit a full flow of solids, either fine or coarse, or which will pass a minimum quantity of solids with a minimum loss of fluid, or which will close the orifice against the outflow of fluids if no solids are passing from the centrifuge.

Another object of the invention is to provide an orifice regulator for desanding devices, or the like, which will discharge solids outward thereby and retain lost circulation material within the mud in which it is suspended.

Still another object of the invention is to provide an orifice regulator for discharging solids from a desanding device, which orifice regulator may be regulated to control the amount of usable fluids lost.

A further object of the invention is to provide an orifice regulator for desanding devices which will operate on a lower pump pressure than has normally been used heretofore.

Yet another object of the invention is to provide an orifice regulator for discharging solids from a desanding device which is low in the cost of manufacture, easy to use and to regulate, and which efficiently separates solids from liquids.

Yet another object of the invention is to provide an orifice regulator for a centrifuge, which will separate heavy, wanted solids from a mixture of viscous mud, heavy solids and lighter solids, which lighter solids, such as sand, shale, rock and the like are unwanted.

Still a further object of the invention is to provide an orifice regulator for a centrifuge which will separate heavy, wanted solids, such as ores and free metal from a mixture of materials within viscous mud, which materials include lighter solids, the heavier solids being removed in a continuous manner, and wherein the mud mixture containing the lighter solids is directed through a subsequent centrifugation to remove the lighter solids from the mud in a continuous manner.

A still further object of the invention is to provide an orifice regulator for a centrifuge which will be regulated within a working range, by suction created within the centrifuge, so as to discharge solids in accordance with the velocity at which the mud travels within the centrifuge and the viscosity of the mud in which the solids are suspended.

With these objects in mind and others which will become manifest as the description proceeds, reference is to be had to the accompanying drawings, in which like reference characters designate like parts in the several views thereof, in which:

FIG. 1 is an elevational view of a centrifuge, such as used for removing solids, such as sand, gravel and other solids and cuttings from drilling mud, and showing the orifice regulator mounted on the lower end thereof;

FIG. 2 is a sectional view taken on the line 2—2 of FIG. 1, looking in the direction indicated by the arrows;

FIG. 3 is an enlarged, fragmentary, elevational view of a centrifuge, with parts broken away and shown in section to bring out the details of construction, and showing the orifice regulator installed on the lower end thereof, with the full outline of the orifice regulator shown in position to close the orifice, with the dashed outline of the orifice regulator showing same in open position;

FIG. 4 is a perspective view taken from the top, side and an end of the orifice regulator shown apart from the centrifuge, and with cooperating mounting brackets being shown broken away and in section, and spaced therefrom, and showing a regulating weight broken away to show the construction of the device;

FIG. 5 is a view similar to FIG. 1, but showing a discharge pipe connected to the fluid discharge opening of the centrifuge;

FIG. 6 is a diagrammatic, sectional view showing the relation of the partial vacuum to the valve member to maintain the valve member closed; and FIG. 7 is a view similar to FIG. 6, but showing the vertex of the partial vacuum shifted upward due to the accumulation of solids in the lower portion of the cone to permit pressure to be applied to the valve to cause discharge of the solids.

With more detailed reference to the drawing the numeral 6 designates generally a centrifuge for removing solids from liquids, one use of such centrifuge is with rotary drilling rigs for removing solids, such as sand, shale, gravel and rock cuttings from the drilling fluid as the well is being drilled.

Another use of the device is for selectively removing certain heavy solids from especially prepared viscous mud but permitting other solids of lighter density to flow outward through the discharge of the centrifuge. This use is adaptable for removing heavy solids such as heavy ores, and free metals, such as gold, silver, copper and the like, while permitting the lighter unwanted solids to be flowed outward through the discharge of the centrifuge. In using the centrifuge in this manner it is desirable to pass the material containing both the heavy, wanted solids and the lighter, unwanted solids through a centrifuge at one velocity, so as to separate the heavy solids, such as ore and free metals, such as gold, silver, and copper from the viscous mud and to pass the mud mixture as discharged from the first centrifuge through a second centrifuge at a higher centrifugal speed, so that the lighter solids, such as sand, gravel, shale, and the like are removed from the mud mixture, so that the mud mixture, which has been freed of such solids, can be re-used.

While the present invention is described somewhat in detail with respect to the separation of solids from drilling fluid, it is to be understood that the terminology is representative, in the manner of separating of solids, whether or not the separated solids are discarded or saved. In the case of separating sand, shale, and gravel from drilling rig mud, these solids are normally discarded. However, in the separation of ore and free metals from an especially prepared viscous fluid, these solids are recovered for use.

The centrifuge 6, as best illustrated in FIGS. 1 and 2, comprises a conical hopper 17, with the upper portion 14 thereof forming a cylindrical chamber, which chamber has a pipe 12 in fluid communication therewith, which pipe 12 is positioned to one side thereof in tangential relation thereto, so as to give fluid passed therethrough at relatively high velocity a swirling action. The heavy solids contained in the fluid will be thrown to the inner diameter of the chamber 14 in the upper portion of conical hopper 17, which heavy solids will settle, by gravity, downward along the inner surface 16 of liner 8 of the centrifuge 6, which liner is usually rubber or a rubber-like material, to protect the inner surface of the hopper from abrasion by the solids in the drilling mud. The solids are discharged from the hopper through neck 18 thereof, which neck has an opening 20 at the lower end thereof, as will be brought out more in detail hereinafter.

The mud or drilling fluid which has been cleansed of solids, being of lighter density, will move toward the center of the centrifuge 6, and will flow upward through pipe 15, which is located centrally of chamber 14, and outward from the centrifuge 6, through discharge pipe P to discharge at E into a sump or pit S, FIG. 5, for re-use. If the discharge pipe P extends to a point below the bottom of centrifuge 6 to such extent to create too much suction due to a siphon action, a vent V, in the discharge pipe P, may be opened a desired amount to equalize any excessive suction on centrifuge 6.

The centrifuge 6 is preferably composed of several sections which are flanged together by the respective flanges 14a 17a, 24 and 24a. The respective complemental flange portions of the centrifuge sections have bolts passing therethrough in such manner as to enable a particular section to be removed for repair and replacement of parts. The centrifuge 6 has a mud inlet line, which mud line directs the drilling mud and the solids contained therein through pipe 12 from the drilling rig (not shown) into the centrifuge 6, where it will be processed to free it of the solids contained therein and to put the mud into condition for re-use with a minimum loss of fluid during the process.

As the fluid containing the sand and other solids is swirled around the upper portion 14 of the centrifuge 6, the solids will flow downward along the inner surface 16 of the rubber liner 8 of the centrifuge, which solids pass into the neck 18 of the centrifuge, the lower end of which neck forms the orifice 20. With the orifice open, and being of sufficient size, the solids will flow outward therefrom. However, drilling mud is also contained within the centrifuge 6, so if the orifice is not closed or restricted after the heavier solids pass outward therefrom, the drilling fluid, such as mud, oil, or the like which is being used for circulation fluid, will pass outward therethrough and be wasted.

The present device has a pair of lugs 22 mounted on the lower face of flanged plate 24, which flanged plate 24 is bolted to the lower end of housing 17 of the centrifuge 6. The lugs 22 are each apertured, as indicated at 26, to receive a pin 28 therethrough.

An orifice regulator closing device, generally designated by the numeral 30, is constructed of an arm 32 having an aperture 34 formed transversely therethrough, so when the arm 32 is positioned between lugs 22 on flanged plate 24, the aperture 34 will register with apertures 26 in lugs 22, so that pivot pin 28 may pass therethrough to pivotally mount the orifice regulator closing device 30. The arm 32 has a bolt screwthreaded thereinto to form an outwardly extending lever 36. It is preferable to have annular grooves 38 formed around lever 36 at spaced intervals along the length thereof, which grooves complementally receive internal, resilient ribs 40 within slide weight 42. The slide weight 42 preferably has a metal shell thereon, so as to provide the desired amount of counter weight for valve closure member 49. By having internal annular ribs 40 formed within weight 42 of rubber or other yieldable material, it is possible to adjust the weight 42 along the length of lever 36 quickly and efficiently, and yet the weight 42 will be maintained in the exact relation on the lever 36, by the ribs 40 within weight 42 engaging annular grooves 38 within lever 36.

A U-shaped member 44 is secured to the lower side of the arm 32 and extends downward from arm 32 and has a re-entrant portion 46, which portion 46 is screwthreaded to receive a bolt 48 therein. A lock nut 50 is screwthreaded onto bolt 48 so as to be in abutting relation with the end of U-shaped member 44, so as to hold the bolt 48, which bolt has a cone-shaped, resilient orifice regulator closure member 49 thereon, on the re-entrant portion 46 of the U-shaped member 44. The bolt 48 may be used to regulate the closure member with respect to the lower face 52 of rubber or elastomer liner 8. The regulator closure member 49 on U-shaped member 44 is adjusted so as to be in seating relation with the lower face 52 of liner 8, which forms the orifice 20. The lock nut 50 is used to secure the bolt 48 in fixed relation to the U-shaped member 44. The weight 42 is adjusted on lever 36 so that when the centrifuge 6 is filled with swirling mud to operating capacity, the closure member 49 will be held against the lower face 52 of liner 8 in seated relation by suction. However, any appreciable added solids on the upper conical face 51 of closure member 49 will change the working range of the suction created by the vertex of a partial vacuum zone within the centrifuge to cause the closure member to move downward and the arm 32 to pivot about pivot pin 28 whereby solids will be discharged.

The U-shaped member 44 has sufficient throat therein to abridge the lower end 54 of the housing 17 of centrifuge 6.

OPERATION

In the operation of the centrifuge to remove solids from mud, such as drilling mud, it is desirable to remove all the sand, gravel, shale and other solids therefrom, both solids of minute character and the coarser solids. It is preferable to remove these solids from the drilling mud or drilling fluid with a minimum loss of drilling fluid and of the additives thereto, including "lost circulation material." With respect to using the centrifuge for removing solids cut from the formation being drilled, from the drilling mud, the design of an orifice regulator must take into consideration that such solids are to be removed from the mud in varying quantities, from zero to the maximum quantity which the orifice is capable of passing. These different situations arise from different drilling conditions, such as drilling a few inches of formation in an hour, to drilling as much as one hundred feet or more per hour. These different formations which are drilled at different speeds, give up the solids in varying quantities, and it is to this end that the present device has been designed, that is, to handle solids in these various quantities and capacities, with little or no loss of drilling mud.

It has been found by tests, that certain action takes place in the separation of solids from mud, and with the separation being substantially constant through a range from a four pound input mud pressure, to a seventy pound input mud pressure, with the centrifuge creating a partial vacuum within the conical hopper thereof, the mud with solids entrained therein, such as sand, shale, and gravel, will enter the centrifuge in tangential relation, which will swirl the mud within the centrifuge around the periphery of the chamber thereof, and with the mud, from which the solids have been separated, moving towards the center of the centrifuge upward and out through the discharge pipe 15; with the solids moving around the periphery of the chamber of the cone downward, thereby losing velocity so these solids will move from the interior 16 of cone 17 into the neck 18 and onto the normally closed valve closure member 49. As long as a partial vacuum is created within the interior of the conical centrifuge 6, the suction of the partial vacuum will cause the valve closure member 49 to remain closed against the lower face 52 of neck 18, if no solids sufficiently dense as to settle are present in the drilling mud. However, if solids are present in the neck 18 in sufficient quantity, even in such small amount as a teaspoonful, to change the working range of the orifice regulator by suction created, the closure 49 will be opened and the solids will be discharged, whereupon the valve closure member 49 will close. Only a counter-weight, such as indicated at 42, is necessary to maintain the valve closure member 49 in closed position when the centrifuge is operating. If the discharge pipe P leads to the level of or below the discharge neck 18, a vent valve V in pipe P may be used to equalize siphon suction.

If the lower end of the discharge pipe P is a substantial distance below the outlet neck 18, the discharge pipe will need to be vented by a vent V, or the siphon suction will be so great that the valve closure member 49 will remain closed until solids in a great amount accumulate in the neck 18 the suction on which solids would cause dehydration thereof to such an extent that they would not readily flow from the neck 18. While the centrifuge operating under partial vacuum conditions is most satisfactory, it is desirable to vent V the discharge line at, or slightly above, the level of the discharge end of neck 18, or maintain the end of the discharge pipe P at such level that a minimum amount of drilling mud will be discharged with the solids out through the neck 18, yet it is desirable that a very small amount of liquid be in the solids to permit an automatic flow of the solids from the lower end of neck 18, without having to introduce a liquid thereinto to wash the solids from the lower end of the neck 18 of the centrifuge 6.

In the separation of solids from liquids it is found that a small amount of sand can be introduced into the inlet while the device is running on a fluid that is free of said solids, and has not been discharging, upon the introduction of a small amount of sand, as little as a teaspoonful, the valve closure member 49 will open and most of the sand will be discharged and by moving weight 42 to another position but operating under the same conditions otherwise, the sand will also be discharged.

The partial vacuum created within the centrifuge will assist in holding the valve closure member 49 in closed relation so long as solids do not gather on upper conical face 51 of valve closure member 49, however, upon a small amount of solids gathering on the upper conical face 51 of valve closure member 49, these solids will be discharged in amounts smaller than necessary to overcome the counterbalance weight 42, therefore it is considered, that the orifice regulator is maintained closed within the working range, by suction by the vertex of the partial vacuum created within the centrifuge, however when the solids within the neck of the discharge orifice, change the working range of the suction, as by moving the vertex of the partial vacuum upwardly, the suction is lessened on the closure 49 and the solids are permitted to discharge.

The device works best when the discharge end of pipe P is on a level with or below the level of the discharge end of neck 18 and is not restricted in flow at the discharge end of the pipe. Under some conditions it is necessary that the discharge end of the pipe be above the level of the discharge end of neck 18 or the discharge end of the pipe may be constricted, either of which will cause a back pressure instead of a partial vacuum in centrifuge 6, therefore there will be no suction on the valve closure member 49 to aid in maintaining the valve closed. The outwardly extending bolt 36 forms a lever on which weight 42 is adjustably mounted, therefore the weight 42 will need be adjusted farther outward from pivot member 28, or additional weight added to the bolt or lever 36 to urge the pivoting arm 32 about pivot member 28 to urge the U-shaped member 44, on which valve closure member 49 is mounted, upward so that the valve closure member will seat against the edge or orifice 20 on the lower end of neck 18, thereby permitting the escape of solids but retaining the mud within the centrifuge 6, with only a minimum loss of mud.

Pressures within ranges of four to seventy pounds appear to be favorable for separation of solids, from drilling mud of a well being drilled, from a gradation known as silt through rock cuttings and gravel of a size that will just pass through the neck 18 and in quantities from zero discharge over a period of two to four hours to a substantially constant discharge of a sluice of solids as a result of cutting up to one hundred feet per hour of formation. The viscosity of the mud used under these conditions, for the separation of these solids, is dependent upon local factors; however a viscosity of fifty to sixty cps. has been found suitable for drilling fluids under a wide range of conditions.

In the separation of solids, such as ores and free metals from materials such as sand, shale and rock, having a lower specific gravity, a mud of higher viscosity is used to enable the heavier solids to be thrown against the inner wall of the centrifuge, to move downward to be discharged in an automatically regulated manner through orifice 20 with the valve closure member 49 permitting only the heavier solids to escape, with the lighter solids entrained within the mud flowed outward through the discharge pipe 15, however, the lighter solids can be separated from the mud by a second stage of centrifugation, either by spinning the mud at a higher velocity within centrifuge 6 or by thinning the mud so the lighter solids will be given up more readily at a slower rate of spinning.

The present device is normally maintained in the position as shown in full outline in FIGS. 1 and 3, with the orifice closure 49 being seated on the lower end 52 of liner 8 of the centrifuge 6. With the closure member 49 so seated, and with the weight 42 positioned to hold the closure thereagainst when no solids are present in the mud, the leakage of drilling fluid thereby is prevented. However, upon starting the drilling operation, the drilling mud and cuttings being discharged from the well will flow through pipe 12 into chamber 14 in tangential relation, whereupon the heavy solids will be thrown around the inner diameter of chamber 14, whereupon the solids will move downward along the inclined conical liner 8 by gravity to the opening 20 formed in the lower end of neck 18. As the solids accumulate on the orifice closure member 49, solids will be built up on the closure member 49 to change the working range by the suction created, whereupon, the arm 32 will pivot about pivot pin 28 to move the closure member 49 downward minutely, then the solids within neck 18 will move downward along the inclined face 51 of closure member 49, which has the upper surface thereof conical, as will best be seen in FIG. 4, whereupon, the solids, if in small amounts, will open the closure 49 sufficiently for the solids to work outward between the upper face of the closure and the lower face 52 of the liner 8. However, as the quantity of solids being removed from the drilling mud increases, the solids will build up and the working range of the suction created will be exceeded, which will cause the closure member 49 to move away from the face 52 a proportionately greater distance. Therefore, a greater amount of solids will be discharged. As the solids are discharged through opening 20, the drilling fluid or mud will be discharged through axially positioned pipe 15 in the upper end of centrifuge 6 to be directed into a pipe P (FIG. 5), which leads to sump or to a pit S for re-use.

When using lost circulation materials which have a density not greater than the density of the drilling mud being used, the weight 42 is adjusted along arm 36 until the closure member 49, counterweighted to close the orifice 20 in neck 18, when no formation solids are on the upper face 51 of closure member 49, then as the drilling proceeds, the lost circulation material will work upward within the drilling fluid, and will not pass out through orifice 20 in neck 18, yet the closure 49 will be maintained closed by suction but will permit heavy solids to pass outward as set out above, without any appreciable amount of drilling mud and lost circulation material being allowed to pass through orifice 20 in neck 18.

While the invention has been described more particularly for use with liquids or muds of high viscosity, such as drilling fluids, it is to be understood that solids which are entrained within liquids such as oil or water, at normal viscosity, may be separated therefrom and the solids so separated discharged in the same manner from the orifice of the centrifuge as they accumulate in the lower portion thereof, with the valve closure member 49 seating on the lower edge of orifice 20.

The orifice regulator mechanism may also be used to discharge solids from the lower end of the centrifuge, when any fluid is used, as it is evident, from the operation of the orifice regulator, that a partial vacuum exists within the center of the centrifuge, due to the swirling action of the fluids and solids around the periphery thereof. However, a greater centrifugal force exists at the upper portion of the centrifuge, which is larger in diameter than the lower portion thereof, with the centrifuge tapering downwardly and inwardly with a relatively steep taper, of some 10 to 15 degrees, so that the solids will move down the wall readily and with a minimum of friction. However, it is evident that a partial vacuum exists in the upper portion of the cone, due to the swirling action of the fluid and solids, and that it extends downward to a point a spaced distance above the bottom of the cone. However, as more solids accumulate in the lower portion of the centrifuge, at the point where the partial vacuum or negative pressure becomes zero pressure and that the solids accumulated below this point create a positive pressure from there to the outlet of the cone. As the solids build up, the point of "zero" pressure moves upward, the suction on the valve closure member 49 becomes zero and the accumulation of solids becomes so great as to create a positive pressure on valve closure member 49 and the solids will discharge, however, immediately upon the discharge of the solids, the point of "zero" pressure moves to a point at the outlet opening of orifice 20, this negative pressure or partial vacuum causes a suction in the area which surrounds the center of the housing of the centrifuge 6, which is not occupied by drilling fluid, after the solids have been discharged out through valve closure member 49. This partial vacuum or negative pressure will immediately cause the valve closure member 49 to seat in sealing relation on the lower edge of orifice 20 and the cycle of accumulation and discharge will be repeated continuously without manual attention, due to the constant shifting of the pressure from a positive pressure to a "zero" or negative pressure.

Due to the shifting of the point of "zero" pressure within the lower portion of centrifuge 6, the discharge of solids may be in small amounts or in a substantially continuous stream. The shifting of pressure from a negative pressure to zero pressure and to a positive pressure, causes such fluctuation of pressure as to permit discharge of solids both in minute quantities and larger quantities up to a continuous flow of solids from the outlet 18. The counterweight 42 is of sufficient weight to close valve closure member 49 in sealing relation with the lower end of the neck 18, however upon suction being exerted upon the valve closure member 49 it will not open until the negative pressure has moved upward in the cone of the centrifuge to such extent that the negative pressure or suction cannot maintain the valve closure member 49 closed.

Having thus clearly described the invention, what is claimed as new and desired to be secured by Letters Patent is:

1. A method of separating solids from drilling fluid by the use of a cone-shaped centrifuge forming a chamber having a tangential opening at the upper portion thereof, a central fluid discharge opening in the top of the centrifuge, and a normally air tight, fluid pressure responsive, valved outlet opening in the lower end of the cone-shaped centrifuge, which method comprises;
   (a) introducing tangentially, under pressure into the centrifuge, a mixture of drilling fluid containing solids,
       (1) swirling the mixture, by pressure, about the periphery of the chamber within the cone-shaped centrifuge to create centrifugal force, the partial vacuum zone created by the swirling mass having a vertex and extending to the lower portion of the centrifuge,
       (2) creating withing the center of the centrifuge said partial vacuum zone to normally hold the valved outlet opening closed in air tight relation by suction, when the vertex of said partial vacuum zone is in one position,
       (3) throwing the solids outward by centrifugal force to pass downward by gravity to accumulate in the lower portion of the centrifuge, thereby to change the shape of the chamber within the centrifuge,
   (b) discharging fluid, as the solids pass downward, through the central discharge opening in the top of the centrifuge,
   (c) moving the vertex of the partial vacuum zone upward by changing the shape of the chamber in the centrifuge to relieve the suction on the valved outlet opening, and
   (d) replacing the suction on the valved outlet opening with positive fluid pressure exerted by the fluid in the chamber, to open the valved outlet opening to discharge the solids from the lower portion of the centrifuge.

2. A method of separating solids from a viscous fluid by the use of a cone-shaped centrifuge forming a chamber having a tangential opening in the upper portion thereof, an axial fluid discharge opening in the top of the centrifuge, and a normally fluid tight, fluid pressure responsive, valved outlet opening in the lower end of the cone-shaped centrifuge, which method comprises;
   (a) introducing tangentially, under pressure into the centrifuge, a mixture of viscous fluid containing solids,
       (1) swirling the mixture of viscous fluid and solids, by pressure, about the periphery of the chamber within the cone-shaped centrifuge to create centrifugal force, the partial vacuum zone of the swirling mass having a vertex and extending to the lower portion of the centrifuge,
       (2) creating within the center of the centrifuge said partial vacuum zone to normally hold the valved outlet opening closed in fluid tight relation, by suction, when the vertex of said partial vacuum zone created by the swirling mass, is in one position,
       (3) throwing solids outward by centrifugal force to pass downward by gravity to accumulate in the lower portion of the centrifuge, thereby to change the shape of the chamber within the centrifuge,
   (b) discharging fluid from which solids have been separated, as the solids pass downward, through the axial discharge opening in the top of the centrifuge,
   (c) moving the vertex of the partial vacuum zone upward by changing the shape of the chamber in the centrifuge to relieve the suction on the valved outlet opening, and
   (d) replacing the suction on the valved outlet opening with positive fluid pressure generated by the fluid in the chamber of the swirling of the mixture to open the valved outlet opening to discharge solids from the lower portion of the centrifuge.

3. A method of separating solids from a viscous fluid as defined in claim 2, wherein
   (a) controlling said discharge of solids from the valved outlet opening in the lower end of the centrifuge by the partial vacuum created in the chamber of the centrifuge in proportion to the accumulation of solids in the lower end thereof.

4. A method of separating solids from a viscous fluid as defined in claim 2, wherein
   (a) certain of said solids introduced with said viscous fluid being of a heavier density than other of said solids,
   (b) controlling said valved outlet opening by suction to regulate the discharge of solids of heavier density from the lower end of the chamber of the centrifuge in proportion to the accumulation of the solids of heavier density in the lower end thereof, and
   (c) discharging the fluid and the solids of lighter density from the upper portion of the chamber through said axial discharge opening.

References Cited by the Examiner

UNITED STATES PATENTS

| | | | |
|---|---|---|---|
| 2,009,055 | 7/1935 | Patnoe | 210—113 X |
| 2,564,963 | 8/1951 | Drigenko et al. | 210—512 X |
| 2,648,433 | 8/1953 | Wright et al. | 210—512 X |
| 2,806,599 | 9/1957 | Patrick. | |
| 3,034,647 | 5/1962 | Giesse | 209—144 |

FOREIGN PATENTS 683,203   2/1930   France.

REUBEN FRIEDMAN, *Primary Examiner.*

D. M. RIESS, *Assistant Examiner.*